(12) United States Patent
Coppinger et al.

(10) Patent No.: US 7,920,282 B2
(45) Date of Patent: Apr. 5, 2011

(54) JOB PREEMPT SET GENERATION FOR RESOURCE MANAGEMENT

(75) Inventors: Richard J. Coppinger, Milton, NY (US); Alexander Druyan, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 1373 days.

(21) Appl. No.: 11/360,127

(22) Filed: Feb. 23, 2006

(65) Prior Publication Data

US 2007/0195356 A1 Aug. 23, 2007

(51) Int. Cl.
- G06F 3/12 (2006.01)
- G06F 9/46 (2006.01)
- G06F 15/16 (2006.01)
- G06F 15/167 (2006.01)
- G06F 15/173 (2006.01)
- G06K 15/00 (2006.01)

(52) U.S. Cl. ............ 358/1.15; 358/1.16; 358/1.13; 718/103; 718/104; 718/105; 718/106; 709/207; 709/214; 709/240

(58) Field of Classification Search .......... 709/103, 709/107; 358/1.15; 718/101–104
See application file for complete search history.

(56) References Cited

U.S. PATENT DOCUMENTS

| | | | | |
|---|---|---|---|---|
| 5,619,695 A * | 4/1997 | Arbabi et al. | ................ | 718/100 |
| 6,021,425 A * | 2/2000 | Waldron et al. | ............... | 718/103 |
| 6,504,621 B1 * | 1/2003 | Salgado | ....................... | 358/1.16 |
| 6,779,182 B1 * | 8/2004 | Zolnowsky | ................... | 718/103 |
| 7,064,848 B2 * | 6/2006 | Jackson et al. | ............... | 358/1.13 |
| 7,155,475 B2 * | 12/2006 | Agnoli et al. | ................. | 709/201 |
| 7,342,929 B2 * | 3/2008 | Bremler-Barr et al. | .... | 370/395.4 |
| 7,349,338 B2 * | 3/2008 | Balachandran et al. | ...... | 370/232 |
| 7,448,036 B2 * | 11/2008 | Brenner et al. | ............... | 718/103 |
| 7,743,378 B1 * | 6/2010 | Markov | ........................ | 718/102 |
| 7,752,622 B1 * | 7/2010 | Markov | ........................ | 718/103 |
| 2003/0158913 A1 * | 8/2003 | Agnoli et al. | ................. | 709/219 |
| 2004/0210619 A1 * | 10/2004 | Balachandran et al. | ...... | 709/200 |

* cited by examiner

*Primary Examiner* — Twyler L Haskins
*Assistant Examiner* — Hilina S Kassa
(74) *Attorney, Agent, or Firm* — Matthew W. Baca; Daryl Neff; Geraldine D. Monteleone

(57) ABSTRACT

A method is provided for prioritizing jobs in a computing environment having a plurality of nodes sharing one or more resources. Such method includes, given a job A to be scheduled having certain resource requirements, generating a list P of already scheduled jobs which utilize resources required by job A and which can be preempted by job A. For each resource requirement of job A, an ordered list of jobs which can be preempted by job A is created which is ranked by the applicability of each job in the list relative to resource requirements of job A, so as to provide a plurality of ordered lists, one for each resource requirement. An ordered list L is generated by selecting one of the ordered lists, adding the top-ranked job from that ordered list to list L, then adding the top-ranked job from another one of the ordered lists to list L and so on, by repetitively selecting the top-ranked job from individual ones of all the ordered lists. Finally, a set of jobs to be preempted by job A is selected based on the list L of jobs.

10 Claims, 2 Drawing Sheets

JOB PREEMPT SET GENERATION FOR RESOURCE MANAGEMENT

BACKGROUND OF THE INVENTION

The present invention relates to the management of resources available to a computing system through the preemption of jobs when another (preempting) job is to be scheduled.

Increased reliance of businesses on computers has led to the development of better and more complex computing systems. Computing systems used by different businesses can be simple, including one or a few computers, or complex, involving a complex network of computers in processing communication with one another. In certain instances, several businesses may even share network environments. Available resources even when remotely located, may need to be shared among such businesses. In either case, some resources need to be shared at any one time. In large environments, the demands on these shared resources can be much greater than the available resources at any one time. In such circumstances, it becomes increasingly important to prioritize the availability of resources. When resources are prioritized and used efficiently, latency and processing time are reduced for all users of a computing system.

To manage resources efficiently, processing tasks are handled according to priority. High priority jobs are performed ahead of other jobs. Sometimes, jobs that are executing or are about to be executed are preempted to free up resources for higher priority jobs. A non-trivial problem is to efficiently determine which of the low priority running jobs are the best candidates to be preempted. Such jobs must be capable of being preempted, such that the resources freed up by those low priority jobs match the requirements of the high priority ones in terms of processing time and resource availability. The number and identity of jobs to be preempted must be determined accurately to avoid freeing up of resources which will be unused by the preempting high priority job. This avoids adversely affecting overall processing time and availability of resources or the network as a whole to one or more users or businesses.

Heretofore, a satisfactory solution for efficiently determining a set of jobs to be preempted did not exist. Prior art approaches produce undesirable side effects. For example, one prior art approach is to perform an exhaustive search over all possible preempt sets (i.e. sets of jobs which could be preempted). Even though an optimal set of lower priority jobs is preempted by this method, the method takes an unacceptably long time to be performed. Such method suffers from processing times which grow exponentially with the number of jobs under consideration.

Another approach is to assign weights to the jobs and then sort the jobs according to the weights. A big drawback to this approach is that it is heuristic and deterministic. Instances of pathological problems exist in which the algorithm always computes a bad solution. An example of this would be preempting most of the jobs, even if preempting one or two of the jobs would be sufficient. Preempting more jobs than necessary can affect overall performance and resource availability in the following ways. Unnecessarily preempted jobs are delayed and take longer to complete. The process itself of preempting jobs takes time to save the state of the preempted jobs prior to executing the higher priority jobs. In addition, time is needed to reschedule unnecessarily preempted jobs when the computing system becomes available again to run those jobs.

Consequently, as computing systems become more complex and encompass more shared resources and users, improved techniques are needed for determining which jobs should be preempted when higher priority jobs are submitted for execution.

SUMMARY OF THE INVENTION

Accordingly, a method is provided for prioritizing jobs in a computing environment having a plurality of nodes sharing one or more resources. Such method includes, given a job A to be scheduled having certain resource requirements, generating a list P of already scheduled jobs which utilize resources required by job A and which can be preempted by job A. For each resource requirement of job A, an ordered list of jobs which can be preempted by job A is created which is ranked by the applicability of each job in the list relative to resource requirements of job A, so as to provide a plurality of ordered lists, one for each resource requirement. A list L is generated by selecting one of the ordered lists, adding the top-ranked job from that ordered list to list L, then adding the top-ranked job from another one of the ordered lists to list L and so on, by repetitively selecting the top-ranked job from individual ones of all the ordered lists. Finally, a set of jobs to be preempted by job A is selected based on the list L of jobs.

BRIEF DESCRIPTION OF THE DRAWINGS

The subject matter which is regarded as the invention is particularly pointed out and distinctly claimed in the concluding portion of the specification. However, both the organization and method of practice of the invention, together with further objects and advantages thereof, may best be understood by reference to the following description taken in connection with the accompanying drawings in which:

DETAILED DESCRIPTION

In accordance with an embodiment of the present invention, a method is provided for managing the resources of a computing system through the generation of a minimal preempt set or list of jobs to be preempted upon scheduling of a preempting job, e.g., a higher priority job. An ordered list of preemptable jobs is generated which takes into account various types of resources needed by each of the preemptable jobs. When a job having relatively high priority is to be executed, jobs are preempted in the order appearing on the list so that only the jobs are preempted that are assigned the quantity of resources needed by the higher priority job.

Figure 1:
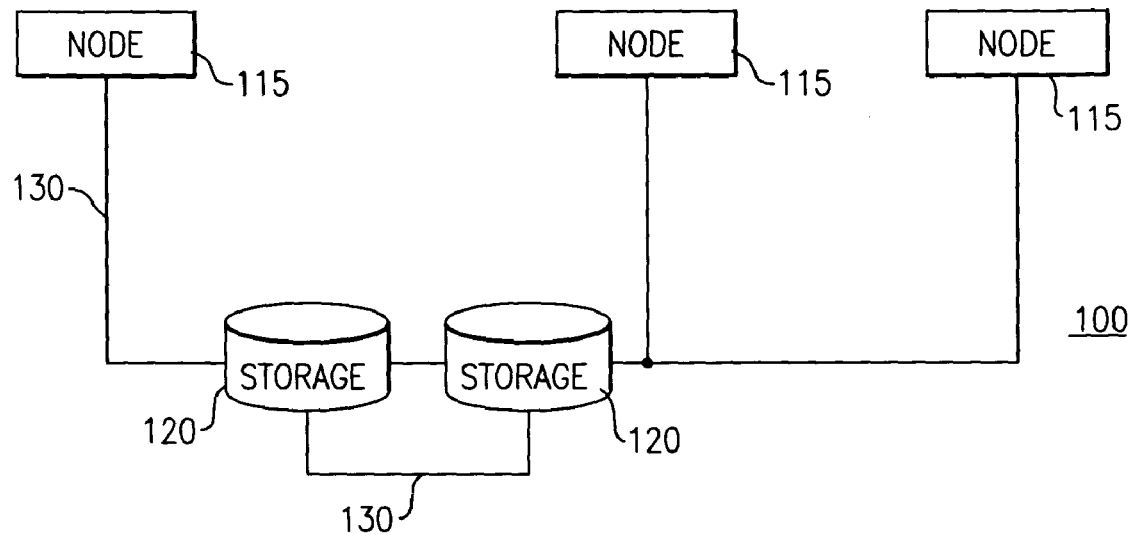
FIG. 1 is a block diagram illustrating an exemplary computing system including shared resources supporting an embodiment of the present invention.

A computing system 100 in accordance with an embodiment of the invention is illustrated in FIG. 1. As shown therein, the computing system 100 includes a plurality of networked nodes 115, e.g., processors or groups of processors, each of which is operable individually or to cooperate together on processing tasks. Each node includes one or more processors or computing devices, and optionally includes one or more local or main memory components, displays, printers, input output (I/O) devices or other such devices. The nodes 115 and one or more storage units 120 are connected together via a communication network 130. The communication network 130 may be simple, including only few links, or may be complex and include buses, routers, high capacity lines, switches and other similar components that are not illustrated individually in FIG. 1. The storage units 120 may also communicate with each other via the network 130. Examples of storage units 120 are semiconductor memories, main memory and cache memory, and/or other similar devices such as storage disks and/or tape drives.

A job may be scheduled to run on any one of the nodes 115 and one or more shared nodes or resources such as printer resources, or it may involve retrieval of data from one or more of the storage units 120. In larger processing networks, the number of jobs and the necessity to share available resources requires that a system schedule execution of high priority jobs, as discussed above.

Figure 2:
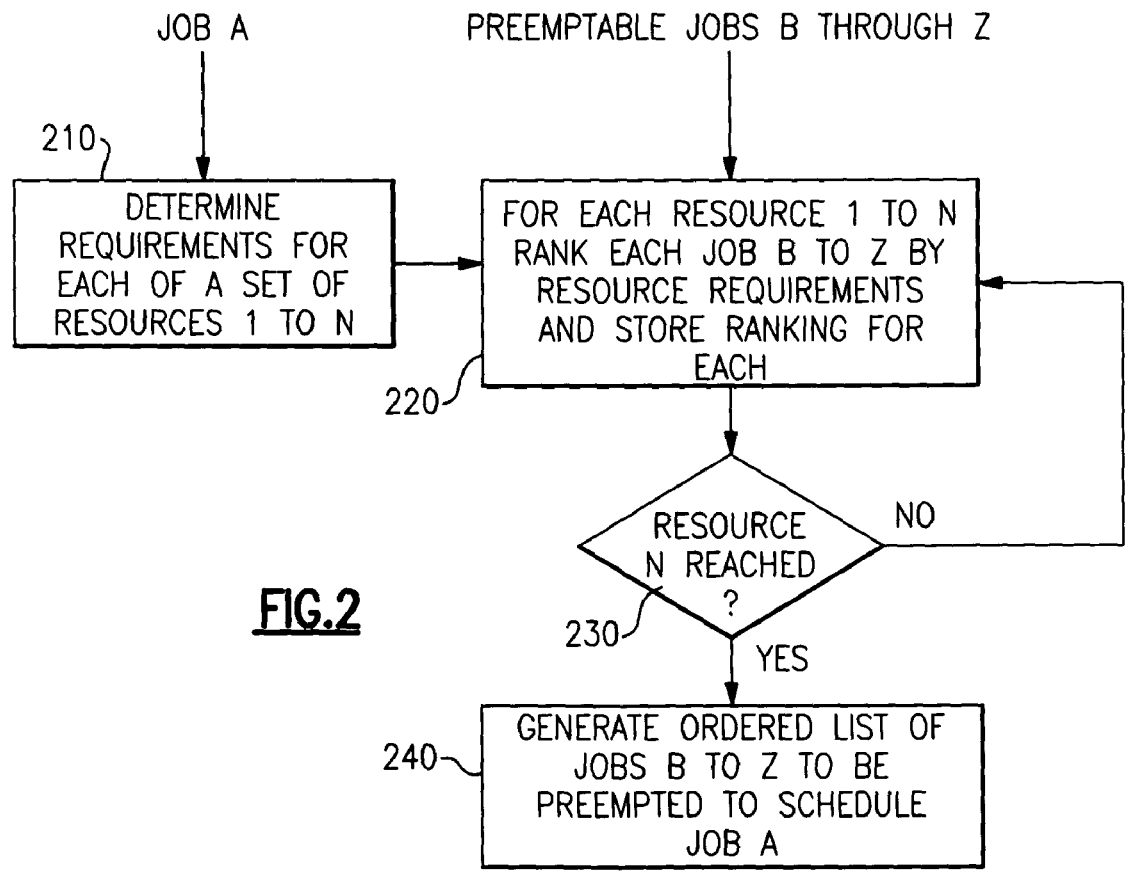
FIG. 2 is a flow chart illustrating a method of managing resources of a computing system in accordance with an embodiment of the present invention.

FIG. 2 is a flow chart illustrating a method of determining a set of preemptable jobs or "preempt set" in accordance with an embodiment of the invention. In an example of such method, a job A is presented for scheduling, where A denotes any job selected for scheduling on any basis. For example, the job A can be selected because it is next in line to be scheduled based on some criteria. In other examples, the job A may be up for scheduling because it has high priority or because an interrupt occurs and the job A must be scheduled in response to the interrupt. In step 210, the resource requirements for executing such job A are determined. Specifically, for each of the available resources in the computing system, it is determined how much of the required resource is necessary to execute the job A. This determination is done individually for each of the resources 1 through N of the computing system.

Next, a set of preemptable jobs "Ps" or "preempt set" of jobs is matched with the specific resources that the individual job A requires to execute. The goal of this task is to produce an ordered list of preemptable jobs Ps to be preempted upon scheduling the higher priority job A. Ideally, only the type and amount of resources that are needed to execute job A will be freed up in the preemption process. Therefore, the jobs to be preempted will be those which require approximately the same types and amount of resources that job A needs to execute. Sometimes, the preemptable jobs will include only one job to be preempted upon scheduling the preempting job (job A). More frequently, a set of preemptable jobs includes several jobs which together require about the same amount and type of individual resources as the preempting job does.

One way of determining the set of preemptable jobs Ps is illustrated in steps 220 through 240. In step 220, a preliminary set of preemptable jobs Ps is identified, such as jobs B through Z, these being jobs that would be subject to preemption, provided that other conditions are met. Generally, a job is preemptable unless it meets one or more special criteria which require that the job be executed at a specific time or within a specific time window. Next, for a particular resource, it is determined which of the preemptable jobs B to Z requires an amount of that resource that most closely matches the requirements of job A (step 220). The resource space can be accounted for in many ways, such as for example, by a Load Leveler's backfill scheduler. The resource space can include that which is bound to a particular processor or node and which is consumable by such node, as well as resources belonging to a particular network communications adapter, and other resources known as "floating resources." For each resource, a preemptable job ranks closest to the preemptor job (job A) when it gives up an amount of that resource which most closely matches the amount which the preemptor job needs. Thus, in step 220, a ranking process is conducted in which each of the preemptable jobs B through Z is ranked according to how closely each such job's requirement for a particular resource matches that of job A. This ranking process is performed for each one of the resources 1 through N. In a particular example, the preemptable jobs are ranked by their requirement for a resource "1". Thereafter, the preemptable jobs are ranked by their requirement for a resource "2" and the ranking is repeated again, one resource at a time until the ranking process has been performed for all N resources. Thus, in step 230, a check is made to determine whether the ranking process has been completed for all resources through resource N.

When resource N is finally reached, an ordered list "L" is generated of the jobs from B to Z that are to be preempted in order to schedule job A (step 240). This ordered list takes into account the requirements of each of the jobs B to Z for each of the particular resources of the computing system. The top-ranked preemptable job on list L is the job for which the requirements for resources best matches the resource requirements of job A to be scheduled. Alternatively, a group of top-ranked preemptable jobs, such as two, three or more preemptable jobs will appear first on list L as a group of jobs which can be preempted together when job A is to be scheduled.

Thus, in determining the list of jobs to be preempted in order to allow job A to be executed by the computing system, a list M, which is initially empty, is populated and grown from list L, taking jobs one by one out of list L in the order in which they are listed in L. Each time, a check is made to determine whether job A can be scheduled with the current set of jobs listed in list M as the preempt set. Eventually, the list M will list a set of jobs that free up enough resources to allow job A to execute. Then, M represents an approximately minimal subset. In one embodiment, a binary search can be performed over list L to determine the identity of the jobs to be included in list M as the preempt set. The order of jobs in list L is fixed and the intent is to look for the smallest index i in the list such that preempting the first i elements of list L will allow job A to be scheduled.

Among advantages that can be achieved in accordance with the method described relative to FIG. 2 are increased efficiency and avoidance of the above-described pathological problems.

In a further example, a case is considered where all of the required resources for a preemptor job A must be satisfied. In such a case there is no preferred resource, and all resources can be treated uniformly. In this example, all resources are treated uniformly, since all required resources have to be satisfied. In this example, each of a set of k resources is denoted Ri, where i is a number from 1 to k. Job A has requirements for each of the resources Ri. At this point, a 'closeness" function "Ms" is used to determine how closely the resource requirements of a given preemptable job match those of job A. Given job A and its resource requirements, a job s' is considered for preemption, and a resource Ri. The function Ms measures how closely the usage of Ri by the job s' matches the requirement of job A for the resource Ri. Measuring function Ms maps the usage by job s' of resource Ri to a weight, e.g., as a function Ms (s', Ri).

In a preferred embodiment, the properties of Ms meet the following requirements:

A pair (s', Ri) maps to a highest value whenever the amount of resource Ri that job s' gives up after it is preempted is exactly the amount that job A requires of the resource Ri.

2) A pair (s', Ri) always maps to a value higher than to which a pair (s", Ri) maps to whenever the job s' gives up more of resource Ri than job A requires while job s" gives up less of Ri than job A requires.

3) A pair (s', Ri) always maps to a value higher than to which a pair (s", Ri) maps to whenever the job s' gives up an amount of resource Ri which is closer to the requirement of job A of resource Ri than the amount which job s" gives up of resource Ri.

There is an infinity of such functions Ms satisfying the above requirement. Any one such function is suitable for application in the method in accordance with the present invention.

Figure 3:
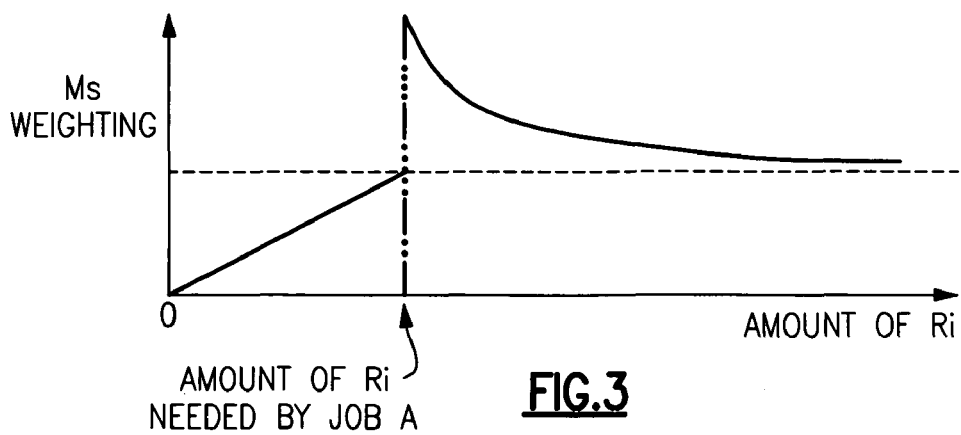
FIG. 3 is a chart plotting a weighting function in relation to available resources R managed in accordance with the method illustrated in FIG. 2.

FIG. 3 is a graph illustrating an example of a measurement or weighting function Ms that satisfies the above three requirements. FIG. 3, graphs the measurement or weighting function Ms in relation to a resource Ri. The weight measured by the measurement function Ms increases linearly in relation to the amount of resource Ri that job A needs until it reaches a point at which the amount of the resource Ri equals the amount needed to execute job A. Examining FIG. 3, it becomes apparent that given Ms, each of the resources Ri induces an order on a set of preemptable jobs B through Z. K sorts of preemptable jobs Ps then can be generated, each corresponding to the order induced by Ms and Ri for a range of values of i ranging between 1 and k.

It should be noted that the measurement or weighting function Ms is not explicitly required, if the order can be determined by other means. It is simply important to understand the connection between the function and the order and the properties resulting thereof.

It is now assumed that each ordered index i corresponding to each resource Ri is drawn vertically, forming a column. The first element of the column i is the job which ranks highest by Ms relative to resource Ri. Similarly, The jth element of the column i is the job which ranks jth relative to the other jobs by Ms relative to resource Ri.

Let us now suppose that Aij is the number of times that job i appears on the ith row (formed from taking every ith element from each column). A job j, which is then ranked highest relative to some number r of resources will be such that Aij=r. Conceptually, the jobs ranked highest and which appear the most number of times on a row are desired jobs, meaning that preempting just them will free up just the resources required for the job S to start. However, just going after those jobs still does not generate an optimal solution. There are many counter examples, such that the solution is not satisfactory. In order to provide a better solution, some randomness has to be introduced.

Figure 4:
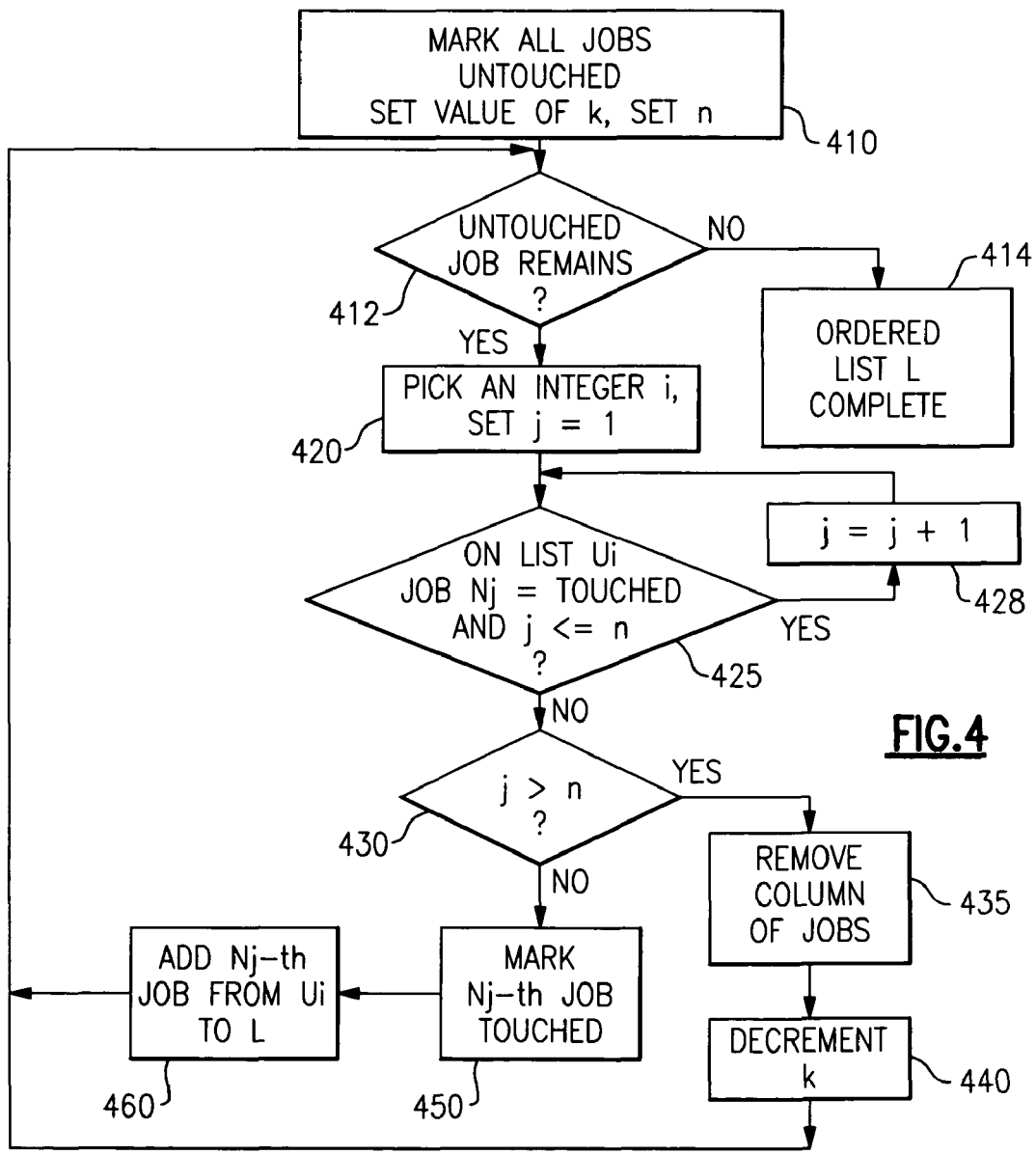
FIG. 4 is a flow chart illustrating a method of generating an ordering on a list of jobs to be preempted, in accordance with an embodiment of the present invention.

FIG. 4 illustrates a method according to an embodiment of the invention for generating an ordered list L of jobs to be considered for preemption upon scheduling a particular job A. The method is conducted for a set of resources Ri, where i=1 to k, and set of preemptable jobs j=1 to n using a set of lists Ui, one for each resource Ri, where i=1 to k. Each list Ui represents an ordering of preemptable jobs Nj, j=1 to n, which is ordered in accordance with how closely the preemptable job Nj matches the requirement by job A for the particular resource Ri. As one moves down the list Ui (and j increases within list Ui), the requirement for resource Ri by the preemptable job Nj tends to become different from the requirement for that same resource Ri by job A.

Accordingly, given a set of lists Ui, one for each resource Ri, in an initial step (410), all preemptable jobs on all lists are marked "UNTOUCHED", meaning that initially all of the preemptable jobs are subject to placement on the master list L to be preempted when job A is scheduled. The number of resources k and the number of preemptable jobs n are also set at this time. Subsequently, in step 412 it is determined whether an untouched job remains on any of the lists Ui. If there is no untouched job on any of the lists Ui, then it is concluded that the ordered master list L of jobs to be considered for preemption is complete (step 414). However, if an untouched job remains on one of the lists, then the method continues populating the master list L. In step 420, an integer i is picked, preferably randomly, to determine a resource-specific list Ui from which a preemptable job Nj thereon is to be selected. The index j is initialized to 1 now to select the first entry of the list Ui for consideration. Then, in step 425, it is determined whether the job Nj is touched and the index j is less than or equal to n. If that job Nj has already been touched, then it may have been selected and placed on the master list L for preemption. In that case, j is incremented (step 428) and the determination is made again whether the next job Nj has been touched and the index j is still less than or equal to n. When such conditions are no longer true, then, as long as the value of j is checked and does not exceed n (step 430), then that Nj-th job is marked as touched (step 450) and that Nj-th job is added from list Ui to the master list L (step 460). Then, the process continues again with the check to determine whether any untouched job remains (step 412).

However, when in step 430 it is determined that the index j is greater than n, then that column or list Ui of preemptable jobs is removed from further consideration (step 435) and the value k is decremented by one (step 440) since all jobs on that list have already been touched.

The embodiments of the present invention above provide an efficient solution to the challenging problem of job scheduling in a cluster of computers. The various embodiments not only provide an efficient system of preempting jobs in a computing environment, but at the same time a solution that is protected from deterministic pathological problem instances that have so far plagued prior art approaches to this problem. In addition, among the advantages provided by the present invention is the ability to preempt an amount of resources which matches the requirements of the preemptor job very closely, a feature that is not present according to the prior art discussed above.

While the invention has been described in detail herein in accord with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. In a computing environment having a plurality of nodes sharing resources, a method of generating a preempt set of scheduled jobs to be preempted when scheduling a preemptor job A for execution, comprising:

operating at least one processor of at least one node of the computing environment to perform operations including:

(a) determining a job A to be scheduled and first resource requirements of job A, the first resource requirements representing first amounts of first resources of different types required to execute job A;

(b) generating a list P of already scheduled jobs that can be preempted by job A, and that collectively have second resource requirements required to execute the already scheduled jobs, the second resource requirements representing second amounts of respective ones of the first resources, the second amounts being nonzero with respect to each of a plurality of the first resources, wherein requirements for amounts of and types of resources required to execute each already scheduled job are subject to vary between respective ones of the already scheduled jobs;

(c) generating a plurality of ordered lists of jobs including one list per each of the plurality of first resources required by job A, by selecting jobs from the list P, each job on each ordered list being ranked by how closely its requirement for that one of the first resources matches the first resource requirements of job A with respect to that first resource;

(d) creating a list L of jobs, the list L including the top-ranked job from each of the plurality of the ordered lists;

determining a weight function by analyzing usage of one or more resources Ri during scheduling of the job A, the determining including generating a closeness function in order to establish a requirement of the job A for any particular resource that has to be used during completion of the job A;

determining an order of jobs to be preempted within the list L based on the weight function; and (e) selecting a set including a plurality of jobs to be preempted based on the list L of jobs.

2. The method of claim 1, wherein step (e) includes performing a log(n) minimization procedure.

3. The method of claim 1, wherein the closeness function represents how closely usage of any resource matches a preemption requirement for the resource to be used.

4. The method of claim 3 wherein the generating of the closeness function is based on a measuring function Ms which maps a job s' considered for preemption and how closely a usage of a resource Ri by job s' matches a requirement of job A for Ri.

5. The method of claim 4, wherein the determining of the weight function is based on how function Ms maps a job s' and resource Ri to a weight.

6. The method of claim 5, further comprising calculating Ms by mapping a job s' and resource Ri to a highest value whenever an amount of resource Ri that s' gives up after it is preempted is exactly an amount that job A requires of resource Ri.

7. The method of claim 5, further comprising calculating Ms by mapping a pair of a job s' and resource Ri to a value higher than to which a pair of another job s" and that resource Ri maps whenever job s' gives up more of the resource Ri than job A requires while job s" gives up less of the resource Ri than job A requires.

8. The method of claim 7, further comprising alternatively calculating Ms by mapping the job S', resource Ri pair (s', Ri) to a condition such that whenever job s' gives up an amount of Ri which is closer to a requirement of job A of Ri than the amount which job s" gives up of resource Ri.

9. The method of claim 5, wherein each ordered list corresponding to each resource Ri is drawn vertically to form column i and a first element of column i is a job which ranks highest by Ms relative to resource Ri.

10. The method of claim 9, wherein a jth element of column i is a job which ranks jth relative to other jobs by Ms relative to resource Ri and Aij is a number of times that a job j appears on an ith row formed from taking every ith element from each column.

* * * * *